C. SOLLIMA.
CHILD'S VEHICLE.
APPLICATION FILED JAN. 20, 1921.
1,400,326.
Patented Dec. 13, 1921.
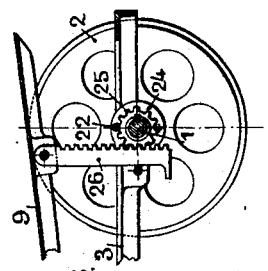
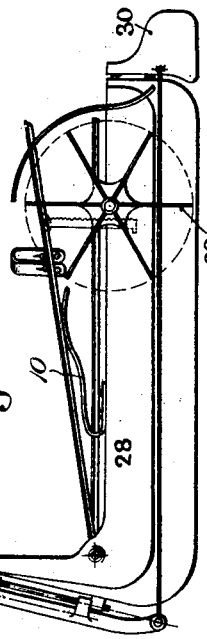
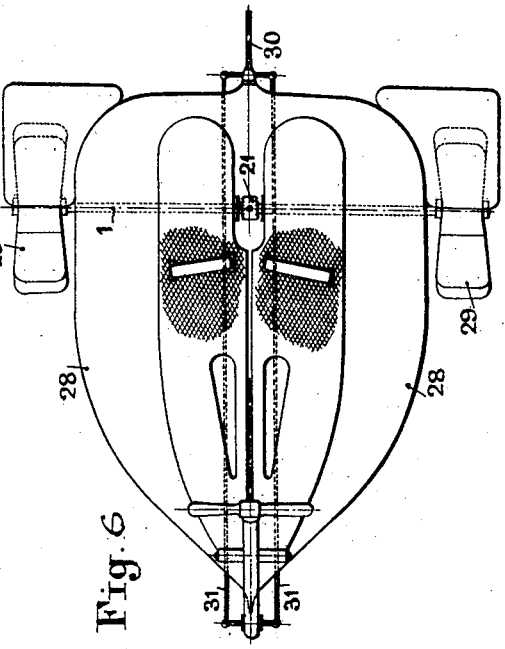
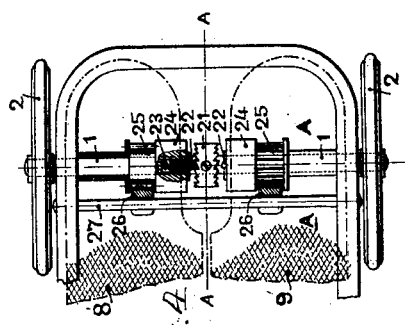
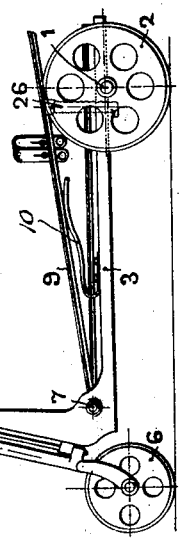
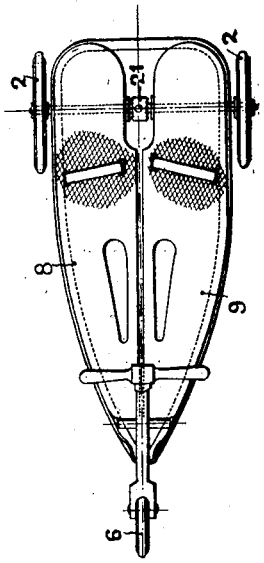
INVENTOR
CARMELO SOLLIMA
BY
ATTORNEYS

UNITED STATES PATENT OFFICE.

CARMELO SOLLIMA, OF PARIS, FRANCE, ASSIGNOR TO CAMILLO PIGNALOSA, OF ROME, ITALY.

CHILD'S VEHICLE.

1,400,326.  Specification of Letters Patent.  Patented Dec. 13, 1921.

Application filed January 20, 1921. Serial No. 438,716.

*To all whom it may concern:*

Be it known that I, CARMELO SOLLIMA, a subject of the King of Italy, and residing in Paris, France, 13 Rue des Abbesses, have invented certain new and useful Improvements in and Relating to Children's Vehicles, for which I have filed application in France March 9, 1918, and in Italy September 8, 1920, and of which the following is a complete specification.

This invention has for its object a child's vehicle consisting of a locomotion toy apparatus more generally known under the name of "patinette" in which there is provided a propelling mechanism comprising two driving pedals connected through a convenient gearing with the rear axle of the apparatus, so as to permit of the propulsion of the vehicle without having to bring the feet into contact with the ground. Thus, a child using the vehicle can retain one of his feet upon each pedal and reproduce in any way the movements of the natural walking.

The vehicle may also be provided with a tight float together with propeller members, such as paddle wheels in order to enable the apparatus to be used on the ground as well as on water.

In the accompanying drawing which shows by way of example two constructional forms of the apparatus according to the invention:

Figure 1 is a side view of the vehicle.

Fig. 2 is a plan view.

Fig. 3 is a cross-section along the line A—A of Fig. 4 drawn on an enlarged scale.

Fig. 4 is a sectional plan of Fig. 3.

Figs. 5 and 6 are a side view and a plan respectively of a constructional form of the vehicle more particularly intended for the use upon water.

Referring to the drawings, 1 is an axle provided with two driving wheels 2 and mounted in the rear of the frame 3, on the forward part of which is pivoted the steering stem 5 carrying the steering wheel 6. On the pin 7 at the forward part of the frame 3, pedals 8 and 9 are mounted and between each of the pedals and the frame is arranged a spring 10. Mounted on the axle 1 of the rear wheels 2 is a ratchet wheel 21 which is rendered solid with the said axle in any convenient way, and both faces of which are provided with ratchet teeth cut in the same direction; meshing with each of the said ratchets is a pawl or group of pawls 22 located with interposition of springs 23 in drums 24 which are arranged so as to freely rotate upon the axle 1. Solid with each of the said drums 24 is a pinion 25 meshing with a rack 26. The said rack is retained in contact with the said pinion by a transverse bar 27, and it is pivoted on its upper end upon the corresponding pedal 8 or 9.

When a child placed upon the vehicle depresses for instance the pedal 9, the corresponding rack causes the pinion 25 to rotate together with the drum 24 solid with the same. The pawl 22 meshing with the ratchet 21 causes the ratchet to rotate, and consequently the axle 1 together with the driving wheels 2 are put in rotation in the direction of the forward running of the vehicle: the pedal 9 having come to the end of its displacement, the vehicle goes on forward owing to its acquired speed, the ratchet 21 then freely rotating and repulsing the spring 22. On depressing the second pedal 8, the same operation of the parts take place, thus giving a new impulse to the toy and so on.

For using the vehicle upon water, the frame 3 of the preceding constructional form is substituted by a convenient float or group of floats 28 (Figs. 5 and 6). The fore wheel 6 is dispensed with and the rear axle carries, instead of the driving wheels 2, paddle-wheels 29 of any approved construction, designed to drive the apparatus on water. The steering is effected by a rudder 30 of any approved shape, connected to the steering stem 5 by means of convenient rods 31.

It is to be understood that the constructional forms have been described by way of example only, the shape of the several parts may of course vary according to the results to be obtained.

What I claim is:

1. In a child's vehicle, a frame, an axle, wheels on the axle, a ratchet wheel fixedly secured to the axle and having on each face ratchet teeth extending in the same direction, drums loosely mounted on the axle on opposite sides of the ratchet wheel, pedals pivoted at one end to the forward part of the frame and having their free ends extending over the axle, a pinion on each drum, spring pawls in the drums and engaging the ratchet wheel, racks pivoted to the free ends of the pedals and meshing with the said pinions, and means for holding the racks in engagement with the pinions.

2. A child's vehicle, comprising a frame, a steering wheel at the front end of the frame, an axle mounted on the frame at the rear portion thereof, wheels on the axle, a ratchet wheel fixedly secured to the axle and having ratchet teeth on each face, drums loosely mounted on the axle on opposite sides of the ratchet wheel, a pinion carried by each drum, pedals pivoted at one end to the forward part of the frame and having their free ends extending rearwardly over said axle, racks pivoted to the free ends of the pedals and meshing with the pinions, and a cross bar on the frame in front of the axle and serving to hold the racks in engagement with the pinions.

In testimony whereof I have hereunto set my hand at Paris, France, this 30th day of December, 1920.

CARMELO SOLLIMA.